March 31, 1942.  D. S. BENNETCH  2,278,099
SPEED GOVERNING SYSTEM
Original Filed July 6, 1939  2 Sheets-Sheet 1

INVENTOR
David S. Bennetch
BY
Albert M. Austin
ATTORNEY

March 31, 1942. D. S. BENNETCH 2,278,099
SPEED GOVERNING SYSTEM
Original Filed July 6, 1939 2 Sheets-Sheet 2
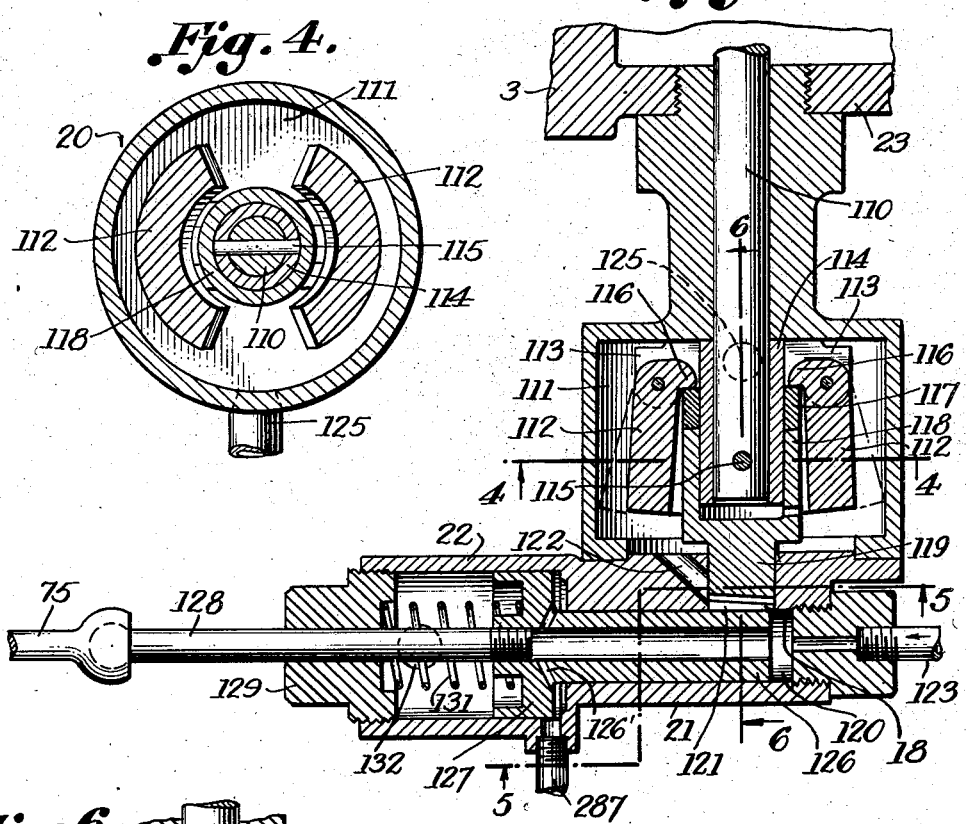
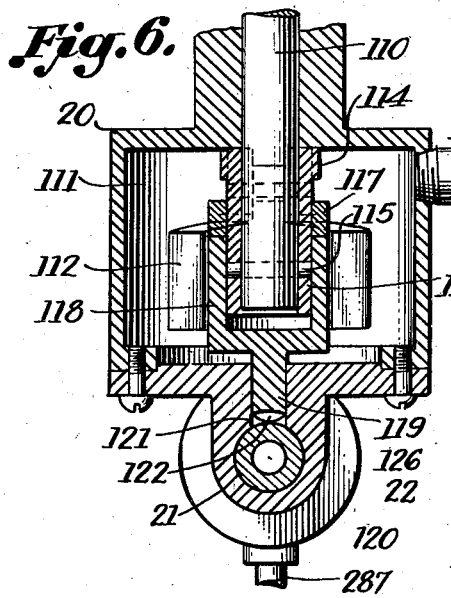
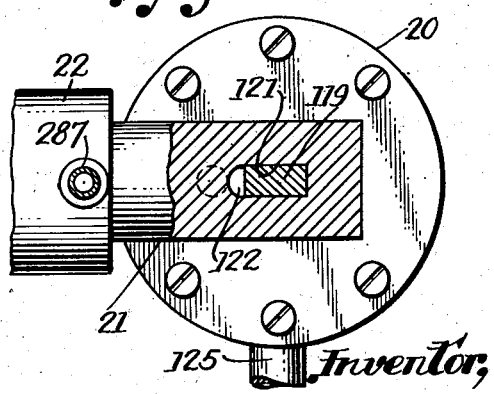
Inventor,
David S. Bennetch
By Albert M. Austin
Attorney Patented Mar. 31, 1942

2,278,099

UNITED STATES PATENT OFFICE 2,278,099

SPEED GOVERNING SYSTEM

David S. Bennetch, Sheridan, Pa.

Original application July 6, 1939, Serial No. 282,982. Divided and this application May 17, 1940, Serial No. 335,816

19 Claims. (Cl. 180—77)

This invention relates to governing devices and more particularly to devices for governing mechanism in accordance with speed.

This application is a division of Serial No. 282,982, filed July 6, 1939.

The prior application relates to an automotive transmission for use on automotive vehicles and the like and provides semi-automatic means whereby the gears may be shifted and the clutch may be operated merely by flicking a single lever without any other manipulation on the part of the operator. The prior application further provides for synchronizing the speed of the automobile engine with the propeller shaft or car speed to facilitate the shifting operation. The synchronizing arrangement utilizes a novel form of speed-responsive governor which forms the basis for the present application.

The present invention thus relates to a governor for accurately correlating the engine and car speeds, although it is obviously not limited to such use. According to the form of the invention shown for purposes of illustration, a centrifugal governor is driven by the propeller shaft of the automotive vehicle, which governor operates a control member or auxiliary plunger. A main cylinder is provided having a main piston therein connected to the throttle valve of the engine carburetor. The pressure end of the main cylinder is connected through a restricted conduit to a source of constant fluid pressure derived from the conventional oil pump ordinarily present in modern automotive internal combustion engines. The auxiliary or control plunger slides in an auxiliary cylinder connecting with the main cylinder at the pressure end thereof, the end of the plunger being tapered and cooperating with the edge of the main piston to provide a critical bleeding point. The parts are so related that, as the main piston moves, the bleeding point decreases in size and the area of the auxiliary plunger exposed to the pressure in the main cylinder increases.

The invention also consists in certain new and original features of construction and combination of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a side elevation partly diagrammatic illustrating the use of the governor with a conventional automobile;

Fig. 3 is a longitudinal section through the governor; and

Figures 1, 2:
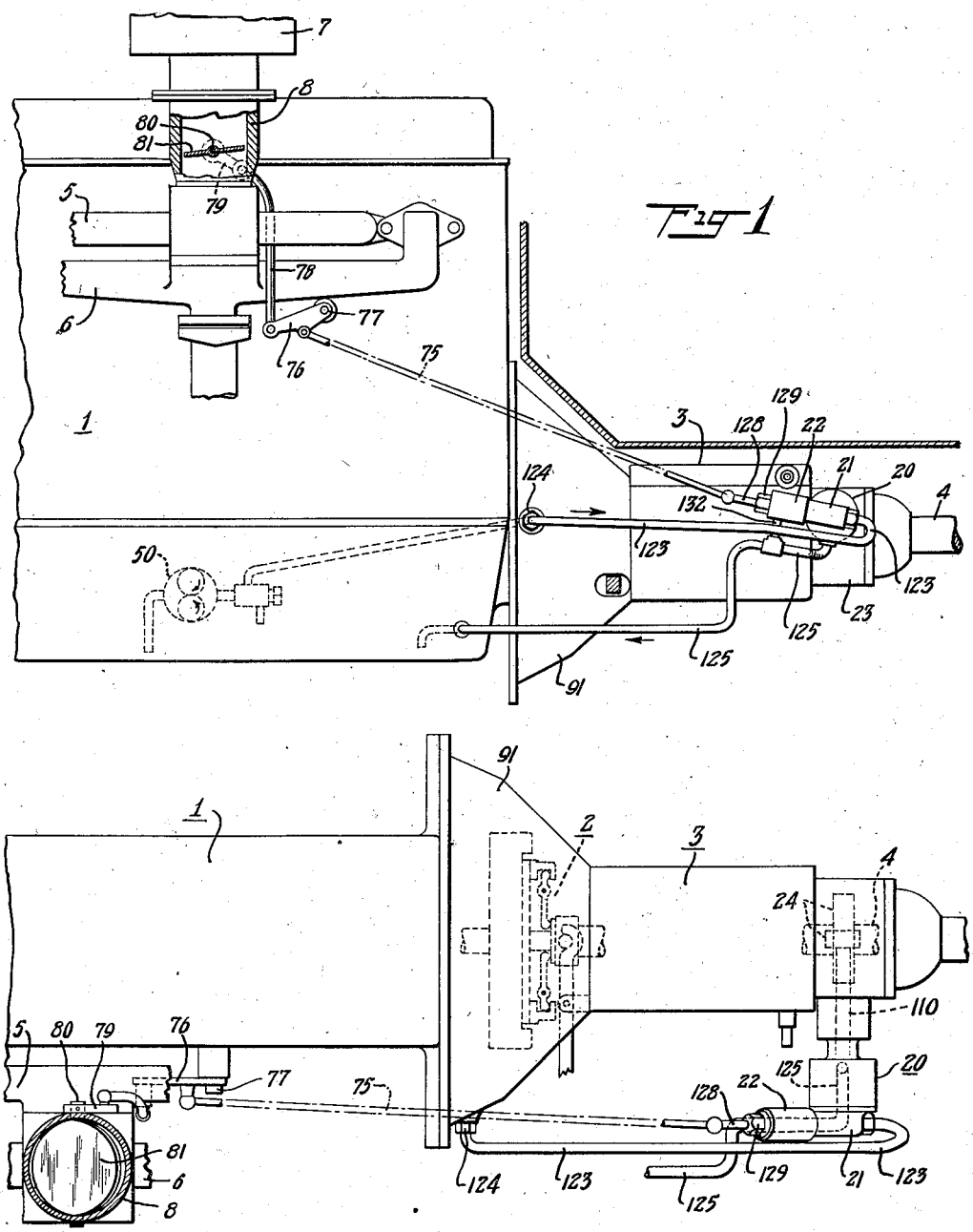
Fig. 2 is a plan view of the representation shown in Fig. 1.

Figs. 4, 5 and 6 are detailed sections taken on the lines 4—4, 5—5 and 6—6 of Fig. 3.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

The invention is described in connection with the semi-automatic transmission disclosed in the prior parent application, but only so much of the automotive engine and transmission is shown as is necessary to illustrate the present invention.

The engine is denoted by 1 and may be of any well-known internal combustion type, the engine driving a car through a conventional mechanical clutch 2, speed change gears in gear box 3 and propeller shaft 4. Mounted upon the engine block 1 in the usual manner is an intake manifold 5, exhaust manifold 6, carburetor 7 and a throttle valve casing 8.

The governor unit for synchronizing engine speed with vehicle speed at certain phases of the gear shifting operation consists generally of a centrifugal governor 20, an oil pressure by-pass valve 21 controlled thereby, and an oil operated piston cylinder 22 which operates upon the engine throttle to synchronize the engine speed with vehicle speed. The governor 20 is mounted upon a housing 23 carried on the rear side (right in Fig. 2) of the gear box 3 and is driven by transfer gears 24 from the propeller shaft 4. The governor is directly responsive at all times to the road speed of the vehicle.

The cylinder 22 has a piston rod 128 connected through suitable control transfer mechanism (not shown) to a bell crank lever 76 pivotally mounted at 77 on the engine block 1. The engine control transfer mechanism is described at length in the parent application, and, inasmuch as it does not relate to the present invention, it is omitted here. For the purpose of the present invention it is sufficient to consider the piston rod 128 connected direct to bell crank lever 76, as indicated by a link 75 shown in dotted lines. The long arm of bell crank lever 76 is connected by link 78 to an arm 79 carried on the end of throttle valve shaft 80. A conventional butterfly valve 81 is secured to shaft 80 within the valve casing 8 which forms a lower extension of a down-draft carburetor 7.

It will be understood that for ordinary operation of the car, the throttle 81 is controlled by the accelerator pedal (not shown) in the ordinary manner, but, during certain periods in the gear shifting cycle, the control of the throttle is taken away from the operator and put under the regulation of the governor for driving the engine at the proper speed to synchronize certain parts of the transmission and clutch.

Referring more particularly to Figs. 3–6, the centrifugal governor 20 governs engine speed through a hydraulic converter which utilizes a small amount of oil taken from the regular engine lubricating system. A drive shaft 110 is journalled in the housing of the governor 20 and has on its inner end the upper gear of the drive gears 24, the lower gear of which is fixed upon the propeller shaft 4. The outer end of shaft 110 projects into a weight chamber 111 of the governor housing and has mounted thereon the elements of the centrifugal governor. The governor consists of a pair of pivoted arcuate weights 112 carried on lateral extensions 113 of a sleeve 114 which is secured on the shaft 110 by a pin 115. The pivotal ends of the weights 112 are provided with toes 116 which bear on a wear collar 117 slidably mounted upon the outside of sleeve 114 and bearing in turn upon the inner end of a valve sleeve 118 which is also slidably mounted upon sleeve 114.

The outer end of valve sleeve 118 is formed as a rectangular projection 119 (Fig. 5) projecting into and forming a part of the oil pressure bypass valve 21. By-pass valve 21 forms the cover plate of the weight chamber 111 and consists of a cylinder 120 having a rectangular port 121, wherein the projection 119 reciprocates, and a by-pass port 122 connecting port 121 with the weight chamber 111. Oil under substantially constant pressure is admitted into cylinder 120 through a pipe 123 which takes it from the supply created by the conventional oil lubricating pump (indicated diagrammatically by 50 in Fig. 1) mounted in the engine 1. Pipe 123 is connected to the engine oil supply at 124 (Fig. 1) located on the side of the clutch housing 91. Oil which is by-passed through ports 121 and 122 into chamber 111 is led back into the engine crank case through pipe 125.

The oil pressure cylinder 120 is provided with a hollow sliding plunger 126 having an enlarged head or piston 127 which reciprocates in a cylinder 22 formed as an extension of by-pass cylinder 120. Plunger 126 is actuated by the varying oil pressure passing through its hollow center out through ports 126' to the back face of piston 127. A piston rod 128 is fixed in the piston 127, sealing one end of the hollow plunger 126, and passes out of the cylinder 22 through cylinder closure 129.

A compression spring 131 is mounted in the cylinder 22 between the piston 127 and closure 129 and serves as a direct reactance for the variable oil pressure created in cylinders 120 and 22 of the by-pass valve 21. Adjustment of the compression of spring 131 is accomplished by screwing the closure 129 in or out of cylinder 22. Any oil which might leak past piston 127 is led back to the engine crank case through pipe 132 connected to pipe 125.

Pipe 123 is restricted so that only a small part of the oil from the pressure side of the engine lubricating pump 50 is taken. The oil pressure in cylinder 120 is determined by the oil bled from the cylinder through ports 121 and 122. While pressure in cylinder 120 varies considerably due to the action of the governor 20 with different car speeds for reasons explained below more in detail, a comparatively small change in the amount of oil bled is required to obtain this pressure variation, so it may be said that the oil taken by the governor is substantially constant.

The pipe 287 leads to a safety speed control disclosed in the parent application, but forming no part of the present invention. Since this pipe 287 merely communicates pressure to a speed control cylinder with little or substantially no fluid flow through it, for the purposes of this invention the pipe 287 may be considered closed. If it is not desired to use the safety speed control, the pipe 287 may be removed from cylinder 22 and replaced by a plug.

The amount of bleeding during the shifting operation and, therefore, the oil pressure in cylinder 120 is determined by the relative position of the edge of piston 126 and the inclined lower surface of plunger 119. The relative positions of these parts define what may be termed the critical bleeding point, indicated in Fig. 3 by 18. During the shifting operation no important impedance is offered by the piston 126 blocking port 121 or by plunger 119 blocking port 122, so that we have substantially the full oil pressure of cylinder 120 on plunger 119 to the right of the bleeding point 18 and substantially zero oil pressure on plunger 119 to the left of the bleeding point 18.

It is obvious that the size of bleeding point 18 will vary either by movement of piston 126 or by movement of plunger 119, or by movement of both together. Although the size of the bleeding point 18 does not vary greatly, its position varies due to the movement of piston 126.

Fig. 3 shows the position of the governor with the car substantially stationary. The oil supplied to cylinder 120 by the idling engine moves piston 126 to the left to cause it to clear the edge of port 121. When the car is speeded up sufficiently for the shifting operation, the plunger 119 moves down in Fig. 3. The critical bleeding point 18 decreases in size sufficiently to raise pressure in cylinder 120. The higher the car speed the smaller the critical bleeding point 18 becomes and the higher the pressure in cylinder 120. Increase of pressure in cylinder 120 moves piston 126 to the left against its compression spring 131 until it builds up an equivalent force in spring 131. This opens the car throttle and speeds up the engine to correspond to car speed, thus synchronizing engine and car.

It should be noted that downward movement of plunger 119 is resisted not only by increase in pressure in cylinder 120, but also by the additional area of plunger 119 exposed to this pressure caused by movement of piston 126 to the left in Fig. 5.

As an example of the operation of the variable area of plunger 119, assume that the combined area of pistons 126 and 127 is one square inch and that the cross sectional dimensions of plunger 119 are ½"×¼". Consider the conditions when the plunger 119 is half exposed and also when plunger 119 is wholly exposed to the pressure in cylinder 120. When the plunger 119 is half exposed, the exposed area equals ¼"×¼" which equals 1/16th of a square inch. When the plunger 119 is fully exposed, its exposed area is equal to ¼"×½" which equals 1/8th of a square inch. Since the area of piston 126, 127 remains constant, the ratio of exposed area of plunger 119 to the exposed area of piston 126, 127 changes from 1/16th to 1/8th, giving the desired relation between the forces exerted on piston 126, 127 and plunger 119.

During the governing operation, we are dealing with idling conditions of the engine. If the engine is pulling the car, its idling speed is too fast and hence the throttle must be closed so that no driving torque shall be imparted by the engine to the car. If, on the other hand, we are using the engine as a brake, as by going down a hill, the engine speed is too slow and the throttle must be opened so that no torque shall be imparted to the engine from the car.

With the engine idle, comparatively small movement of the butterfly throttle and linkage is necessary to change the idling speed through the small range necessary for synchronization. This movement may thus be considered proportional to engine speed. The ordinary centrifugal governor, on the other hand, does not respond directly proportionally to car speed, but its response varies with the square of the car speed. The hydraulic arrangement may, therefore, be termed a converter since it converts the non-linear response of the governor to a linear response so that the movement imparted to the throttle valve through the link 130 is substantially directly proportional to car speed.

A further advantage of the hydraulic converter is the fact that large mechanical force may be obtained by the use of a small governor. In actual tests two two-ounce governor weights operated to vary the oil pressure in cylinder 120 from one and one-half to twelve pounds which provided all the force necessary for operating the carburetor throttle and overcoming the friction in the linkage. A governor with such small weights obviously has a small operating force at slow speeds, but by the use of the hydraulic converter, this small operating force can be converted into the relatively large force necessary for operating the throttle.

It will thus be seen that, when the engine speed is under control of the governor mechanism, its speed is always related to the car speed.

It will be understood that the connection between governor and throttle as here illustrated is in direct contrast to the connection ordinarily used when using a governor to maintain the speed of a prime mover constant. With the present connection, increase in speed of the car operates to open the throttle, causing corresponding increase in the speed of the engine, and vice versa. If the governor is used to keep the speed of the prime mover constant, increase in governor speed operates to close the throttle to decrease the speed of the prime mover in accordance with well-known governing action.

While certain novel features of the invention have been disclosed and are pointed out in the annexed claims, it will be understood that various omissions, substitutions and changes may be made by those skilled in the art without departing from the spirit of the invention.

What is claimed is:

1. In a governing system, a main cylinder having a port in the side wall thereof, an auxiliary cylinder connected to said port, a plunger slidable in said auxiliary cylinder and having an end surface at an angle to the axis of the main cylinder, a main piston slidable in said main cylinder having an edge cooperating with the end surface of said plunger to form a critical bleeding point, said plunger being so shaped that movement of said main piston, while the plunger remains stationary, changes the size of said bleeding point, a source of substantially constant fluid pressure, a restricted passage connecting said source and said main cylinder at the pressure side of said critical bleeding point, said main cylinder having an exhaust port communicating with the exhaust side of said bleeding point, a speed responsive governor connected to move said plunger, said main piston being connected to the control element of the device to be governed.

2. In a governing system, a main cylinder having a port in the side wall thereof, an auxiliary cylinder connected to said port, a plunger slidable in said auxiliary cylinder, a main piston slidable in said main cylinder and having a part cooperating with the end surface of said plunger to form a critical bleeding point, a spring opposing movement of said main piston, said plunger being so shaped that movement of said main piston against said spring, while the plunger remains stationary, changes the size of said bleeding point, a source of substantially constant fluid pressure, a restricted passage connecting said source and said main cylinder at the pressure side of said critical bleeding point, said main cylinder having an exhaust port communicating with the exhaust side of said bleeding point, a speed responsive governor connected to move said plunger, said main piston being connected to the control element of the device to be governed.

3. In a governing system, a main cylinder having a port in the side wall thereof, an auxiliary cylinder connected to said port, a plunger slidable in said auxiliary cylinder, a main piston slidable in said main cylinder having a part cooperating with the end surface of said plunger to form a critical bleeding point, a spring opposing movement of said main piston, said plunger being so shaped that movement of said main piston against said spring, while the plunger remains stationary, increases the cross-sectional opening of said bleeding point, a source of substantially constant fluid pressure, a restricted passage connecting said source and said main cylinder at the pressure side of said critical bleeding point, said main cylinder having an exhaust port communicating with the exhaust side of said bleeding point, a speed responsive governor connected to move said plunger inwardly with increase in speed, said main piston being connected to the control element of the device to be governed.

4. In a governing device, a pressure chamber having a first cylinder and a second cylinder communicating therewith, first and second pistons in said cylinders respectively, a source of substantially constant fluid pressure, a restricted passage connecting said source and said pressure chamber, means cooperating with said pistons whereby movement of said first piston causes movement of said second piston and movement of said second piston gradually changes the area of said first piston exposed to the pressure in said chamber, a speed responsive device connected to said first piston, a device to be governed, and means responsive to pressure in said chamber for controlling the position of said last-mentioned device.

5. In an automotive vehicle, an engine having a carburetor and throttle, a propeller shaft, a speed responsive centrifugal governor driven by said propeller shaft, said governor having an actuating element, a converter comprising a main cylinder having a main piston, a source of substantially constant fluid pressure connected to said cylinder, an auxiliary cylinder having an auxiliary piston connected to said actuating element, movement of said main piston exposing varying area of said auxiliary piston to the pressure in said main cylinder, linkage between said main piston and said throttle, whereby to govern prime mover speed proportionally to propeller shaft speed.

6. In a device of the class described, a prime mover having a control element, a propeller shaft driven by said prime mover, a speed responsive centrifugal governor driven by said propeller shaft, said governor having an actuating element, a converter comprising a main cylinder having a main piston, a source of substantially constant fluid pressure connected to said cylinder, an auxiliary cylinder having an auxiliary piston connected to said actuating element, movement of said main piston exposing varying area of said auxiliary piston to the pressure in said main cylinder, linkage between said main piston and said control element, whereby to govern prime mover speed proportionally to propeller shaft speed.

7. In an automotive vehicle, an engine having an oil pump, a carburetor and throttle, a propeller shaft, a speed responsive centrifugal governor driven by said propeller shaft, a main cylinder, a conduit having a restricted passage connecting said main cylinder and oil pump, a main piston in said cylinder, a spring opposing the pressure in said cylinder, connections from said piston to said throttle, said cylinder having a port in its side wall variably uncovered by movement of said main piston, said port forming an auxiliary cylinder, an auxiliary piston in said auxiliary cylinder, a second port in the wall of said auxiliary cylinder, means connecting said centrifugal governor and auxiliary piston to move the latter inwardly with increase in speed, the surface of the inner end of said auxiliary piston being inclined and forming, with the edge of said main piston, a critical bleeding point determining the pressure in said main cylinder, whereby increase in vehicle speed tends to decrease the size of said bleeding point, displacing said main piston to open said throttle, the throttle-opening movement of said main piston tending to increase the size of said bleeding point and increasing the area of said auxiliary piston exposed to pressure in said main cylinder.

8. In an automotive vehicle, an engine having a carburetor and throttle, a propeller shaft, a speed responsive centrifugal governor driven by said propeller shaft, a main cylinder, a source of substantially constant fluid supply connected to said main cylinder, a main piston in said main cylinder, a spring opposing the pressure in said cylinder, connections from said piston to said throttle, said cylinder having a port in its side wall variably uncovered by movement of said main piston, said port forming an auxiliary cylinder, an auxiliary piston in said auxiliary cylinder, a second port in the wall of said auxiliary cylinder, means connecting said centrifugal governor and auxiliary piston to move the latter with change in vehicle speed, the surface of said auxiliary piston being inclined and forming, with a part of said main piston, a critical bleeding point determining the pressure in said main cylinder, whereby change in speed varies said throttle.

9. In a device of the character described, a pressure chamber having first and second holders communicating therewith, first and second pressure responsive elements in said holders respectively, a source of fluid pressure, a passage connecting said source and said pressure chamber, means cooperating with said elements to control passage of said fluid whereby movement of said first element causes change in fluid pressure in said chamber which causes movement of said second element and movement of said second element changes the area of said first element exposed to pressure in said chamber, a movement initiating device connected to said first element, and a movement responsive device connected to said pressure chamber.

10. In a device of the character described, a main cylinder, an auxiliary cylinder intersecting said main cylinder at the side thereof, a piston in said main cylinder, a plunger in said auxiliary cylinder, said piston having a part closely associated with the end face of said plunger, means for supplying said main cylinder with fluid, the leakage between said part and said end face determining the pressure in said main cylinder for operating said piston, the movement of said piston determining the area of said end face exposed to the pressure in said main cylinder.

11. In a governing system, a main cylinder having a pressure chamber, an auxiliary cylinder intersecting said main cylinder, a plunger slidable in said auxiliary cylinder, a main piston slidable in said main cylinder and having a part cooperating with the end surface of said plunger to form a critical bleeding point for said chamber, a spring opposing movement of said main piston, a source of fluid pressure, a passage connecting said source and said pressure chamber, the area of said end surface exposed to pressure in said chamber changing with movement of said main piston against said spring, a speed responsive centrifugal governor connected to move said plunger, and means responsive to pressure in said pressure chamber for connection to the control element of the device to be governed.

12. In a device of the character described, a casing having a main cylinder, an auxiliary cylinder intersecting said main cylinder at the side thereof, a piston in said main cylinder, a plunger in said auxiliary cylinder, said piston having a part closely associated with the end face of said plunger to form a bleeding point, means for supplying said main cylinder with liquid, the leakage between said end part and said end face determining the pressure in said main cylinder for operating said piston, the movement of said piston determining the area of said end face exposed to the pressure in said main cylinder, said casing having an exhaust passage for liquid delivered by said bleeding point.

13. In a device of the character described, a casing having a main cylinder, an auxiliary cylinder intersecting said main cylinder at the side thereof, a piston in said main cylinder, a plunger in said auxiliary cylinder, said piston having an edge closely associated with and movable along the end face of said plunger, said end face and said edge forming a critical bleeding point, means for supplying said main cylinder with liquid, the leakage through said bleeding point determining the pressure in said main cylinder for operating said piston, said edge dividing said end face into two portions, one of which is exposed to the pressure in said main cylinder, the other of which is open to exhaust, the movement of said piston determining the relative areas of said two portions.

14. In a governing system, a main cylinder having a pressure chamber, an auxiliary cylinder intersecting said main cylinder, a plunger slidable in said auxiliary cylinder, a main piston slidable in said main cylinder and having a part cooperating with the end surface of said plunger to form a critical bleeding point for said chamber, a spring opposing movement of said main piston, a source of substantially constant fluid pressure, a restricted passage connecting said source and said pressure chamber, the area of said end surface exposed to pressure in said chamber increasing with movement of said main piston against said spring, a speed responsive centrifugal governor connected to move said plunger, and means responsive to pressure in said pressure chamber for connection to the control element of the device to be governed.

15. In a governing system, a main cylinder having a pressure chamber, an auxiliary cylinder intersecting said main cylinder, a plunger slidable in said auxiliary cylinder, a main piston slidable in said main cylinder and having a part cooperating with the end surface of said plunger to form a critical bleeding point for said chamber, a spring opposing movement of said main piston, a source of fluid pressure, a passage connecting said source and said pressure chamber, the area of said end surface exposed to pressure in said chamber increasing with movement of said main piston against said spring, a speed responsive centrifugal governor connected to move said plunger, and means responsive to pressure in said pressure chamber for connection to the control element of the device to be governed, whereby to govern the position of said control element substantially directly proportionally to the speed of said governor.

16. In a governing system, a speed responsive centrifugal force governor, a pressure chamber, an element in said chamber operated by said governor, means for changing both the fluid pressure in said chamber and the area of said element exposed to said pressure, and means for obtaining governing action in response to said fluid pressure.

17. In a governing system, a speed responsive mechanical centrifugal force governor, a fluid pressure chamber, an element in said chamber operated by said governor, means for changing the area of said element exposed to pressure in said chamber to vary the force exerted by said pressure on said governor, and means for obtaining governing action in response to said fluid pressure.

18. In a speed governor, a stationary casing having a pressure chamber therein, a source of fluid pressure, a passage between said pressure chamber and said source, a movable instrumentality closing said pressure chamber and exposed to pressure therein, said instrumentality defining a bleeding point for the fluid, means controlled by speed for applying a first movement in a first direction to said instrumentality, the size of said bleeding point being controlled by said first movement and thereby affecting the pressure in said pressure chamber, said pressure imparting a second movement transverse to said first direction to said instrumentality which changes the size of said bleeding point, said second movement effecting governing action.

19. In a speed governor, a stationary casing having a pressure chamber therein, a source of liquid pressure, a passage between said pressure chamber and said source, a movable instrumentality closing said pressure chamber and exposed to pressure therein, said instrumentality defining a bleeding point for said liquid, means controlled by speed for applying a first movement in a first direction to said instrumentality, said first movement changing the size of said bleeding point and thereby affecting the pressure in said pressure chamber, said pressure imparting a second movement transverse to said first direction to said instrumentality which changes the size of said bleeding point oppositely to the first change in size, said second movement effecting governing action.

DAVID S. BENNETCH.